(12) United States Patent
Arai

(10) Patent No.: US 11,391,376 B2
(45) Date of Patent: Jul. 19, 2022

(54) SLIDING COMPONENT

(71) Applicant: EAGLE INDUSTRY CO., LTD., Tokyo (JP)

(72) Inventor: Minehiro Arai, Tokyo (JP)

(73) Assignee: EAGLE INDUSTRY CO., LTD.

( * ) Notice: Subject to any disclaimer, the term of this patent is extended or adjusted under 35 U.S.C. 154(b) by 142 days.

(21) Appl. No.: 16/322,811

(22) PCT Filed: Aug. 8, 2017

(86) PCT No.: PCT/JP2017/028659
§ 371 (c)(1),
(2) Date: Feb. 1, 2019

(87) PCT Pub. No.: WO2018/034197
PCT Pub. Date: Feb. 22, 2018

(65) Prior Publication Data
US 2019/0178386 A1 Jun. 13, 2019

(30) Foreign Application Priority Data

Aug. 15, 2016 (JP) .............................. JP2016-159198

(51) Int. Cl.
*F16J 15/34* (2006.01)
*F16C 17/04* (2006.01)
*F16C 33/74* (2006.01)

(52) U.S. Cl.
CPC .......... *F16J 15/3496* (2013.01); *F16C 17/04* (2013.01); *F16C 33/74* (2013.01); *F16J 15/34* (2013.01)

(58) Field of Classification Search
CPC ........ F16J 15/3496; F16J 15/34; F16C 17/04; F16C 33/74
See application file for complete search history.

(56) References Cited

U.S. PATENT DOCUMENTS

| | | | |
|---|---|---|---|
| 3,383,116 A | 5/1968 | Carter | ............................. 277/96 |
| 3,527,465 A | 9/1970 | Guinard | |
| (Continued) | | | |

FOREIGN PATENT DOCUMENTS

| | | | | |
|---|---|---|---|---|
| CN | 1245552 | 2/2000 | ............... | F16J 15/34 |
| CN | 1401924 | 3/2003 | ............... | F16J 15/16 |
| (Continued) | | | | |

OTHER PUBLICATIONS

A Second Office Action dated Jul. 25, 2016 by the State Intellectual Property Office of China counterpart application No. 201380029125.0.

(Continued)

*Primary Examiner* — Eugene G Byrd
(74) *Attorney, Agent, or Firm* — Hayes Soloway P.C.

(57) ABSTRACT

A sliding component includes a stationary-side seal ring and a rotating-side seal ring. The stationary-side seal ring and the rotating-side seal ring have their respective sliding faces opposite to each other. The sliding faces are relatively rotated, thereby sealing a high-pressure fluid present on one radial side of the sliding faces relatively rotationally sliding. At least one of the stationary-side seal ring and the rotating-side seal ring includes a substrate, an adhesion layer on the sliding face side of the substrate, and a glassy carbon sheet member stuck on the substrate via the adhesion layer.

1 Claim, 6 Drawing Sheets

(56) References Cited

U.S. PATENT DOCUMENTS

| | | | | |
|---|---|---|---|---|
| 3,704,019 | A | 11/1972 | McHugh | 277/400 |
| 3,782,737 | A | 1/1974 | Ludwig et al. | 277/27 |
| 4,071,253 | A | 1/1978 | Heinen et al. | 277/3 |
| 4,523,764 | A | 6/1985 | Albers et al. | 277/3 |
| 4,889,348 | A | 12/1989 | Amundson | 277/306 |
| 5,071,141 | A | 12/1991 | Lai et al. | |
| 5,092,612 | A | 3/1992 | Victor et al. | 277/96.1 |
| 5,174,584 | A | 12/1992 | Lahrman | 277/400 |
| 5,180,173 | A | 1/1993 | Kimura et al. | |
| 5,224,714 | A | 7/1993 | Kimura | 277/400 |
| 5,447,316 | A | 9/1995 | Matsui | 277/400 |
| 5,556,111 | A | 9/1996 | Sedy | 277/400 |
| 5,558,341 | A | 9/1996 | McNickle et al. | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | F16J 16/34 |
| 6,692,006 | B2 | 2/2004 | Holder | 277/346 |
| 7,258,346 | B2 | 8/2007 | Tejima | 277/399 |
| 7,377,518 | B2 | 5/2008 | Lai | 277/400 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar et al. | 277/399 |
| 8,585,060 | B2 | 11/2013 | Oshii et al. | 277/401 |
| 9,151,390 | B2 | 10/2015 | Hosoe | F16J 15/3412 |
| 9,228,660 | B2 | 1/2016 | Hosoe | F16J 15/3412 |
| 9,574,667 | B2 | 2/2017 | Takahashi et al. | F16J 15/342 |
| 9,772,037 | B2 | 9/2017 | Itadani et al. | F16J 15/3412 |
| 9,958,010 | B2 | 5/2018 | Itadani | F16C 33/74 |
| 10,132,411 | B2 | 11/2018 | Hosoe et al. | F16J 15/164 |
| 10,337,620 | B2 | 7/2019 | Tokunaga et al. | F16J 15/342 |
| 2002/0014743 | A1 | 2/2002 | Zheng | 177/358 |
| 2005/0212217 | A1 | 9/2005 | Tejima | 777/399 |
| 2005/0263963 | A1 | 12/2005 | Lai | 277/399 |
| 2007/0228664 | A1* | 10/2007 | Anand | F16J 15/3496 |
| | | | | 277/399 |
| 2007/0267820 | A1* | 11/2007 | Martin | F16J 15/3496 |
| | | | | 277/404 |
| 2007/0275267 | A1* | 11/2007 | Sabouni | F16J 15/3496 |
| | | | | 428/698 |
| 2007/0296156 | A1 | 12/2007 | Yanagisawa et al. | 277/352 |
| 2008/0100001 | A1 | 5/2008 | Flaherty | |
| 2011/0215531 | A1 | 9/2011 | Tokunaga et al. | 277/399 |
| 2011/0215535 | A1 | 9/2011 | Vasagar | 277/559 |
| 2011/0305871 | A1* | 12/2011 | Tabuchi | F16J 15/3284 |
| | | | | 428/141 |
| 2012/0217705 | A1 | 8/2012 | Hosoe | 277/400 |
| 2013/0168928 | A1* | 7/2013 | Schrufer | C10M 103/02 |
| | | | | 277/500 |
| 2013/0209011 | A1* | 8/2013 | Tokunaga | F16C 33/74 |
| | | | | 384/123 |
| 2014/0159314 | A1* | 6/2014 | Hosoe | F16J 15/34 |
| | | | | 277/358 |
| 2014/0217676 | A1 | 8/2014 | Hosoe et al. | 277/350 |
| 2014/0319776 | A1* | 10/2014 | Theike | F16J 15/3496 |
| | | | | 277/405 |
| 2015/0115540 | A1 | 4/2015 | Tokunaga | F16J 15/34 |
| 2015/0167847 | A1 | 6/2015 | Tokunaga | |
| 2015/0345642 | A1* | 12/2015 | Haas | F16J 15/3496 |
| | | | | 427/577 |
| 2016/0033045 | A1 | 2/2016 | Itadani et al. | F16J 15/3412 |
| 2016/0097457 | A1 | 4/2016 | Sun et al. | F16J 15/3412 |
| 2017/0261107 | A1* | 9/2017 | Martin | F16J 15/3452 |
| 2018/0017163 | A1 | 1/2018 | Hosoe et al. | F16J 15/164 |
| 2018/0073394 | A1 | 3/2018 | Tokunaga et al. | F01D 25/18 |
| 2018/0112711 | A1* | 4/2018 | Itadani | F16J 15/363 |
| 2018/0128377 | A1 | 5/2018 | Tokunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0170257 | A1 | 6/2019 | Hosoe et al. | F16J 15/3412 |
| 2019/0285115 | A1 | 9/2019 | Negishi et al. | F16C 17/045 |
| 2019/0301522 | A1 | 10/2019 | Negishi et al. | F16C 17/02 |
| 2020/0240470 | A1* | 7/2020 | Sorgenti | F16J 15/3212 |
| 2020/0332901 | A1 | 10/2020 | Imura | F16J 15/3412 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |

FOREIGN PATENT DOCUMENTS

| | | | |
|---|---|---|---|
| CN | 101793169 | 8/2010 | F01D 11/08 |
| CN | 101861485 | 10/2010 | F16J 15/34 |
| CN | 103557334 | 2/2014 | F16J 15/34 |
| CN | 104321568 | 1/2015 | F16C 33/72 |
| CN | 104685273 | 6/2015 | F16J 15/34 |
| CN | 110770456 | 2/2020 | F16C 33/12 |
| DE | 3223703 | 6/1982 | F16J 15/34 |
| EP | 2754931 | 7/2014 | F16J 15/34 |
| EP | 3196516 | 7/2017 | F16J 15/34 |
| EP | 3117049 | 9/2017 | F16J 15/34 |
| EP | 3575621 | 12/2019 | F16C 33/10 |
| EP | 3575643 | 12/2019 | F16J 15/34 |
| EP | 3650722 | 5/2020 | F16C 33/12 |
| GB | 2263952 | 8/1993 | F16J 15/34 |
| JP | S51-034974 A | 3/1976 | |
| JP | S52-143571 | 10/1977 | F16J 15/26 |
| JP | S59-195253 | 12/1984 | F16J 15/34 |
| JP | S59-195254 | 12/1984 | F16J 15/34 |
| JP | S63-190975 | 8/1988 | F16J 15/34 |
| JP | H02-136863 | 11/1992 | F16J 15/34 |
| JP | H04-337165 | 11/1992 | F16J 15/34 |
| JP | H05-60247 | 3/1993 | F16J 15/34 |
| JP | H05-296248 A | 11/1993 | |
| JP | H05-90049 | 12/1993 | F16J 15/34 |
| JP | H06-17941 | 1/1994 | F16J 15/34 |
| JP | H06-117547 | 4/1994 | F16J 15/34 |
| JP | H06-323442 | 11/1994 | F16J 15/34 |
| JP | 9-89119 | 3/1997 | F16J 15/34 |
| JP | 9-292034 | 11/1997 | F16J 15/34 |
| JP | H10-281299 | 10/1998 | F16J 15/34 |
| JP | H10-292867 A | 11/1998 | |
| JP | H11-287329 | 10/1999 | F16J 15/34 |
| JP | 3066367 | 5/2000 | F16J 15/34 |
| JP | 2003-343730 | 12/2003 | F16J 15/22 |
| JP | 2005-180652 | 7/2005 | F16J 15/34 |
| JP | 2005-315391 A | 11/2005 | |
| JP | 2005-337503 | 12/2005 | F16J 15/34 |
| JP | 2006-77899 | 3/2006 | F16J 15/34 |
| JP | 2007-162045 A | 6/2007 | |
| JP | 2008-106940 | 5/2008 | F16J 15/34 |
| JP | 2011-74931 | 4/2011 | F16J 15/34 |
| JP | H06-105105 | 4/2011 | F16J 15/34 |
| JP | 2011-185292 | 9/2011 | F16J 15/34 |
| JP | 2012-2295 | 1/2012 | F16J 15/34 |
| JP | 2012-062534 A | 3/2012 | |
| JP | 2014-529052 A | 10/2014 | |
| JP | 2015-68330 | 4/2015 | F04C 29/00 |
| JP | 5693599 B2 | 4/2015 | |
| JP | 2015063647 A * | 4/2015 | |
| JP | 2016-80090 | 5/2016 | F16J 15/34 |
| JP | 5960145 | 7/2016 | F16J 15/34 |
| WO | WO 2006/051702 | 5/2006 | F16J 15/34 |
| WO | WO 2011/115073 | 9/2011 | |
| WO | WO-2012-046749 A1 | 4/2012 | |
| WO | WO 2013/035503 | 3/2013 | F16J 15/34 |
| WO | WO-2013-053411 A | 4/2013 | |
| WO | WO-2014-061544 A1 | 4/2014 | |
| WO | WO 2014/174725 | 10/2014 | F16J 15/34 |
| WO | WO 2016/167262 | 10/2016 | F16J 15/34 |
| WO | WO 2016/186015 | 11/2016 | F16J 15/34 |
| WO | WO 2016/186019 | 11/2016 | F16J 14/34 |
| WO | WO 2016/186020 | 11/2016 | F16J 15/34 |

(56) References Cited

FOREIGN PATENT DOCUMENTS

| WO | WO 2016/203878 | 12/2016 | ............... F16J 15/34 |
| WO | WO 2017/002774 | 1/2017 | ............... F16J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F16J 15/34 |

OTHER PUBLICATIONS

First Notification of Reason for Refusal with Search Report dated Sep. 25, 2015 by the State Intellectual Property Office of China for Chinese counterpart application No. 201380029125.0.

First Notification of Reason for Refusal with Search Report issued by the State Intellectual Property Office of China dated Aug. 24, 2015 for Chinese counterpart application No. 201380024836.9.

First Notification of Reason for Refusal with Search Report issued by the State intellectual Property Office of China dated Aug. 26, 2015 for Chinese counterpart application No. 201380009242.0.

Second Notification of Reason for Refusal with issued by the State Intellectual Property Office of China dated Feb. 5, 2016 for Chinese counterpart application No. 201380024836.9.

First Office Action issued in Chinese Patent Appln. Serial No. 201980007372.8, dated Sep. 27, 2021, with English translation, 13 pages.

First Office Action issued in Chinese Patent Appln. Serial No. 201980010219.0, dated Nov. 30, 2021, with English translation, 13 pages.

International Preliminary Report on Patentability and Written Opinion issued in PCT/JP2013/070713, dated Feb. 10, 2015.

International Search Report (ISR) dated Oct. 29, 2013, issued for International application No. PCT/JP2013/070713.

International Search Report and Written Opinion issued in PCT/JP2013/070714, dated Oct. 29, 2013, with English translation, 14 pages.

International Preliminary Report on Patentability issued in PCT/JP2013/070714, dated Feb. 10, 2015.

International Search Report and Written Opinion issued in PCT/JP2019/003381, with English translation, dated Apr. 2, 2019, 20 pages.

International Preliminary Report on Patentability issued in PCT/JP2019/003381, with English translation, dated Aug. 4, 2020, 12 pages.

International Search Report and Written Opinion issued in PCT/JP2019/000617, dated Apr. 10, 2019, with English translation, 21 pages.

International Preliminary Report on Patentability issued in PCT/JP2019/000617, dated Jul. 14, 2020, with English translation, 13 pages.

International Search Report and Written Opinion issued in PCT/JP2020/003645, dated Mar. 24, 2020, with English translation, 21 pages.

International Preliminary Report on Patentability issued in PCT/JP2020/003645, dated Aug, 10, 2021, with English translation, 11pages.

International Search Report and Written Opinion issued in PCT/JP2020/003641, dated Mar. 31, 2020, with English translation, 13 pages.

International Preliminary Report on Patentability issued in PCT/JP2020/003641, dated Aug, 10, 2021, with English translation, 7 pages.

International Search Report and Written Opinion issued in PCT/JP2020/003643, dated Mar, 17, 2020, with English translation, 17 pages.

International Preliminary Report on Patentability issued in PCT/JP2020/003643, dated Aug. 10, 2021, with English translation, 10 pages.

International Search Report and Written Opinion issued in PCT/JP2020/1003648, dated Mar. 10, 2020, with English translation, 13 pages.

International Preliminary Report on Patentability issued in PCTJP2020/003648, dated Aug. 10, 2021, with English translation, 7 pages.

International Search Report and Written Opinion issued in PCT/JP2020/003647, dated Mar. 24, 2020, with English translation, 14 pages.

International Preliminary Report on Patentability issued in PCT/JP2020/003647, dated Aug. 10, 2021, with English translation, 8 pages.

International Search Report and Written Opinion issued in PCT/JP2020/011926, dated Apr. 28, 2020, with English translational, 12 pages.

International Preliminary Report on Patentability issued in PCT/JP2020/011926, dated Sep. 28, 2021, 4 pages.

Korean Official Action issued in related Korean Patent Application Serial No. 10-2020-7019822, dated Oct. 26, 2021 with English translation (4 pages).

European Search Report issued in related European Patent Application Serial No. 19738181.7, dated Sep. 13, 2021 (10 pages).

European Search Report issued in related European Patent Application Serial No. 19748058.5, dated Oct. 8, 2021 (9 pages).

Office Action issued in U.S. Appl. No. 16/964,943, dated Oct. 4, 2021, 19 pages.

Korean Official Action issued in related Korean Patent Application Serial No. 10-2020-7022307, dated Nov. 26. 2021 with translation, 13 pages.

\* cited by examiner

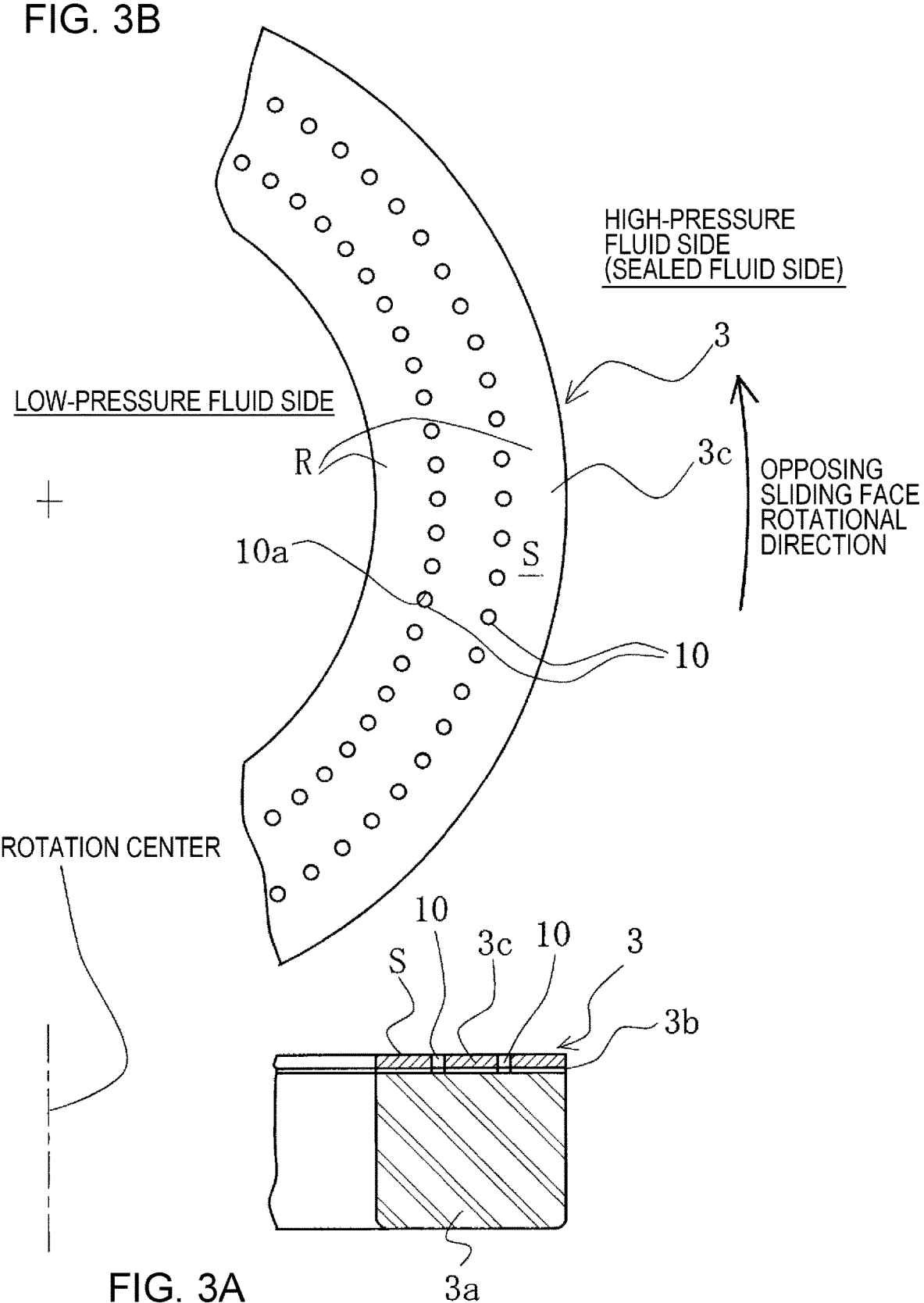

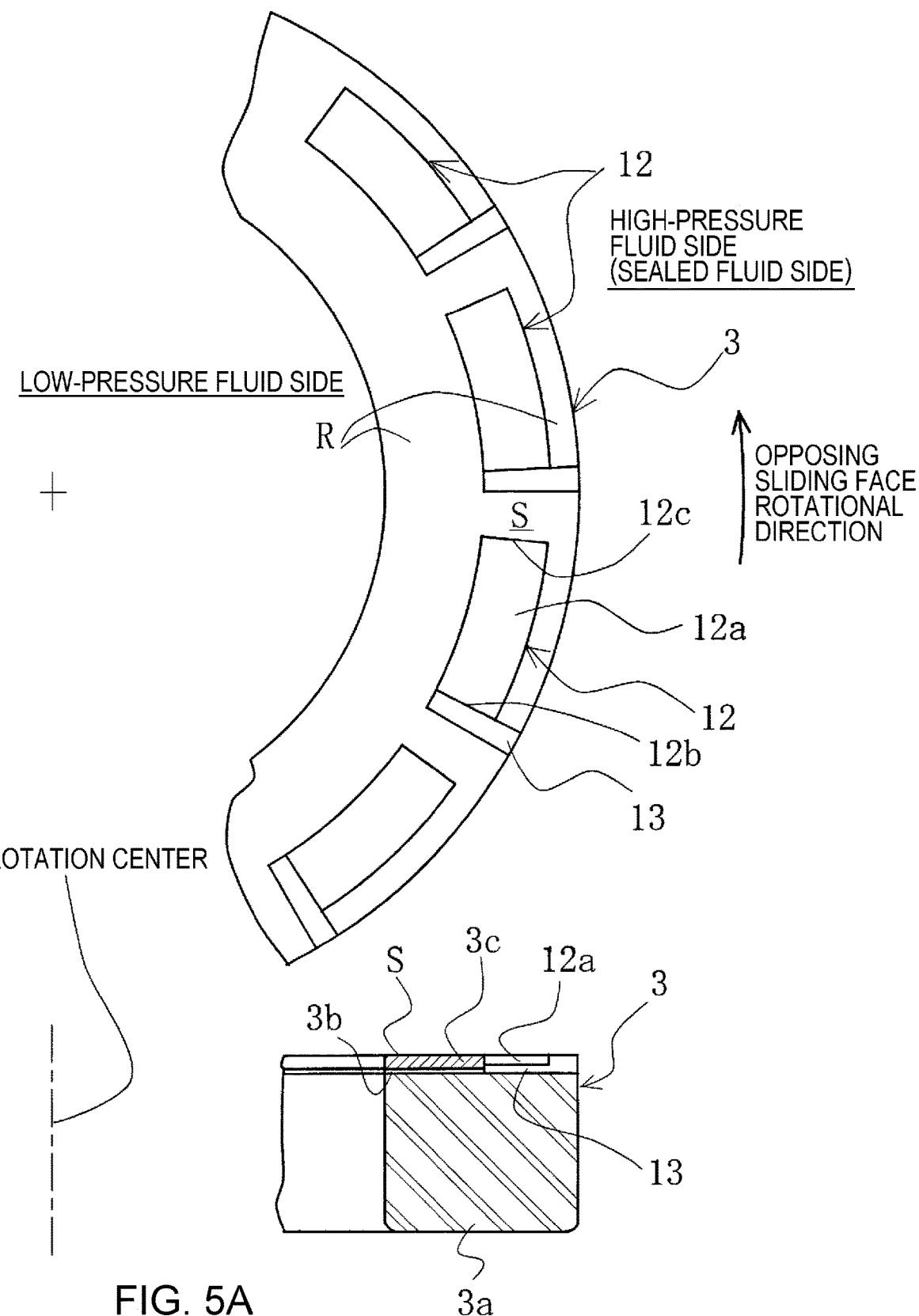

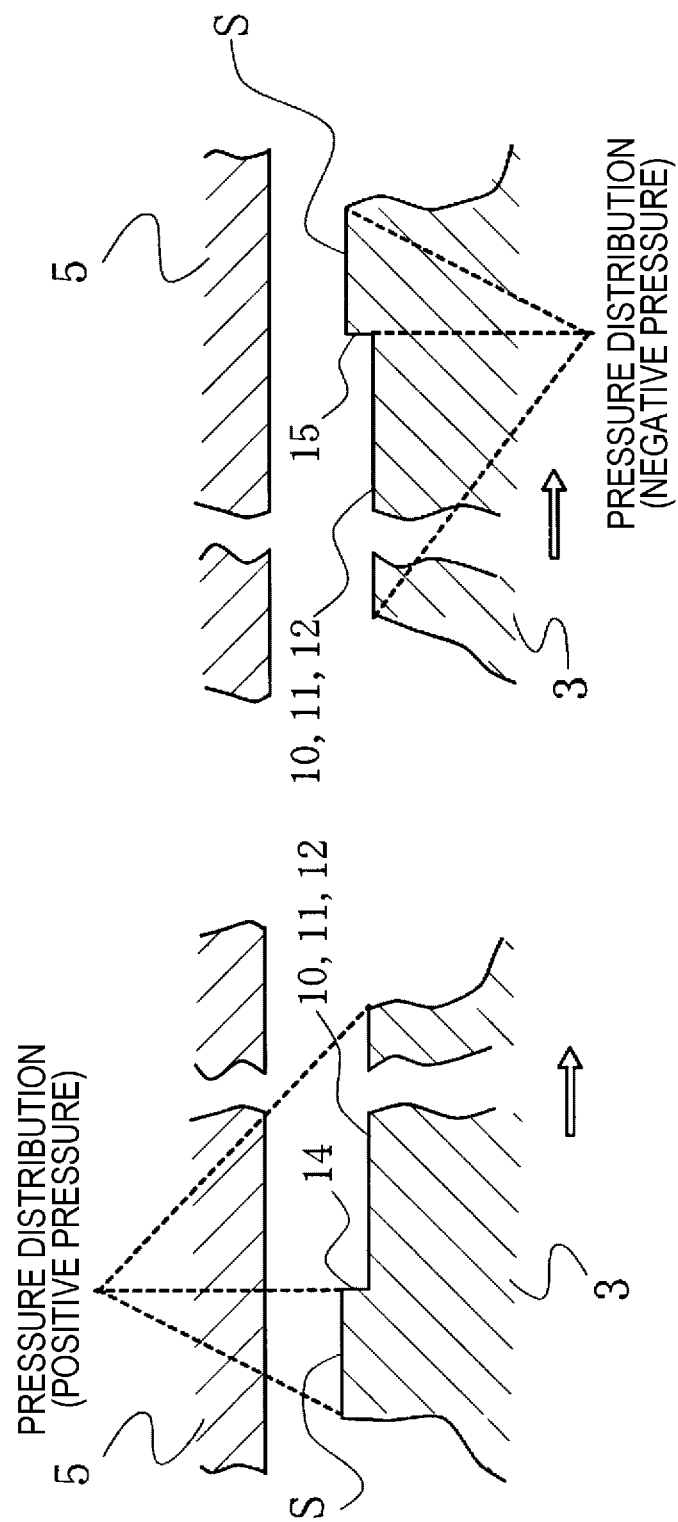

SLIDING COMPONENT

CROSS REFERENCE TO RELATED APPLICATIONS

This application is a U.S. National Stage Application of International Application No. PCT/JP2017/028659, filed on Aug. 8, 2017, and published in Japanese as WO 2018/034197 on Feb. 22, 2018 and claims priority to Japanese Application No. 2016-159198, filed on Aug. 15, 2016. The entire disclosures of the above applications are incorporated herein by reference.

BACKGROUND

Technical Field

The present invention relates to sliding components suitable, for example, as mechanical seals, bearings, and other sliding units. More particularly, the present invention relates to sliding components such as seal rings or bearings that require a reduction of friction by interposing fluid between sliding faces, and prevention of leakage of the fluid from the sliding faces.

Related Art

A mechanical seal, an example of a sliding component, is evaluated for its performance by the leakage rate, wear rate, and torque thereof. Conventional arts have optimized the sliding material and the sliding face roughness of mechanical seals, thereby enhancing the performance and achieving low leakage, long life, and low torque. However, due to growing awareness of environmental problems in recent years, a further improvement in the performance of mechanical seals has been required. Thus, technical development beyond the limits of the conventional arts has been necessary.

It has been confirmed that in a mechanical seal used for cooling a water-cooled engine, for example, as time passes, an additive in antifreeze, e.g. a rust-inhibiting component can be concentrated on a sliding face, forming deposits, and thus degrading the function of the mechanical seal. The deposit formation is considered to be a phenomenon that occurs likewise in mechanical seals of apparatuses that handle chemicals or oils.

In a mechanical seal using a surface texture, negative pressure can be generated in a sliding face, depending on its characteristics. An experiment has confirmed that a sealed fluid entering the sliding face due to the negative pressure can evaporate, causing a deposit formation-causing substance to be excessively precipitated and formed, forming deposits at an increasing rate, and thereby degrading the function of the mechanical seal.

It is conceivable that a diamond-like carbon (abbreviated as DLC) film, for example, is noticed as a film of an adhesion-resistant material, and a sliding face of a sliding member is coated with diamond-like carbon, thereby preventing the buildup of deposits on a surface of a negative-pressure generation mechanism on which deposits tend to be precipitated and formed, as described in JP 2012-62534 A and JP 5-296248 A (hereinafter, referred to as "Conventional Art 1").

It is likewise conceivable that from the viewpoint of preventing the buildup of deposits, a sliding part is made of glassy carbon (hereinafter, referred to as "Conventional Art 2").

As a sliding material having excellent tribological properties, known is one including a hard carbon film with glassy carbon formed all over a sliding face of a sliding material, a micro-periodic structure formed by irradiating the surface of the hard carbon film with an ultrashort pulse laser, and a lubricating layer containing a solid lubricant formed to cover the micro-periodic structure (hereinafter, referred to as "Conventional Art 3." See JP 2007-162045 A, for example.).

However, Conventional Art 1 has a problem with durability because the diamond-like carbon film is about 1 μm in thickness, and thus tends to peel off.

Conventional Art 2 has problems that there is a limit to manufacturing size because a large-volume one cannot be made of glassy carbon, that a crack or deformation occurs because gas generated during carbonization does not easily escape from inside, and that manufacturing takes time because of the necessity of slowing down the release of gas generated from inside.

Conventional Art 3 has a problem that an advanced manufacturing technique is required. For example, substrate selection is necessary, and application of high-density energy is required to prevent a substrate from being thermally and mechanically degraded.

It is an object of the present invention to provide a sliding component that prevents a deposit formation-causing substance from forming deposits on a sliding face even when a liquid of antifreeze to which a rust inhibitor is added is sealed as in a mechanical seal suitable for cooling a water-cooled engine, for example, to improve the sealing function of the sliding face.

In particular, it is an object of the present invention to provide a sliding component that prevents deposition of precipitates on negative-pressure portions and prevents adhesion of deposits on a land even when a deposit formation-causing substance is precipitated and formed from a sealed fluid entering a sliding face due to negative pressure at the sliding face, to improve the sealing function of the sliding face.

It is also an object of the present invention to provide a sliding component improved in the wear resistance and foreign matter-resistant properties of a sliding face.

SUMMARY OF THE INVENTION

To attain the above objects, a sliding component according to a first aspect of the present invention is a sliding component that includes an annular stationary-side seal ring fixed to a stationary side and an annular rotating-side seal ring rotating with a rotating shaft, the stationary-side seal ring and the rotating-side seal ring having respective sliding faces opposite to each other, the sliding faces being relatively rotated, thereby sealing a high-pressure fluid present on one radial side of the sliding faces relatively rotationally sliding, in which at least one of the stationary-side seal ring and the rotating-side seal ring includes a substrate, an adhesion layer on a sliding face side of the substrate, and a glassy carbon sheet member stuck on the substrate via the adhesion layer.

According to this aspect, the presence of glassy carbon on the sliding face of the seal ring prevents concentration of a deposit formation-causing substance and formation of deposits on the sliding face. Thus, the sliding component improved in the sealing function of the sliding face can be provided.

Glassy carbon, which is a material excellent in wear resistance, can prevent wear on the sliding face sliding in a fluid lubrication state from reaching a deep portion, improving the wear resistance and foreign matter-resistant properties of the sliding component.

Separately from the substrate of the seal ring, the sheet member of sheet-shaped glassy carbon is stuck on the sliding face side of the substrate. This configuration can facilitate the escape of gas generated from inside to prevent occurrence of cracks, compared to the case where an entire seal ring is formed of glassy carbon as in Conventional Art 2. Further, the poor thermal conductivity of glassy carbon can be covered by the material of the substrate.

Even a large seal ring that cannot be manufactured when an entire seal ring is formed of glassy carbon can be manufactured.

Even when a surface texture is formed on the sliding face, the surface texture can be formed on the sheet member, and thus is easily formed.

Separately from the substrate of the seal ring, the sheet member of sheet-shaped glassy carbon is stuck on the sliding face side of the substrate. This configuration enables provision of a glassy carbon region on the sliding face without requiring an advanced technique, compared to the case where a glassy carbon modified region is formed on a sliding face of a sliding material as in Conventional Art 3.

The material of the substrate is not limited to materials that allow formation of a glassy carbon modified region. Thus, the degree of freedom in material selection can be increased. For example, a low-cost material can be selected to reduce material cost. Alternatively, for example, a material with good thermal conductivity can be selected to provide a sliding component with high heat dispersion characteristics.

Even when a surface texture is formed on the sliding face, the surface texture can be formed on the sheet member, and thus is easily formed.

According to a second aspect of the present invention, in the sliding component in the first aspect, the substrate is formed of carbon, SiC, or cemented carbide.

According to this aspect, the sliding component can be produced with a commonly used material.

According to a third aspect of the present invention, in the sliding component in the first or second aspect, the adhesion layer is formed of a thermosetting resin.

According to this aspect, only by heating the adhesion layer, the glassy carbon sheet member can be securely integrated with the substrate.

According to a fourth aspect of the present invention, in the sliding component in any one of the first to third aspects, the sheet member has a sliding face provided with dimples.

According to this aspect, a sealed fluid can be held and positive pressure (dynamic pressure) can be generated at the sliding face, so that a fluid film between the sliding faces can be increased to improve lubrication performance.

The dimples can be provided previously with a mold or by blanking when the sheet member is produced. Thus, the need to form the dimples after the sheet member is adhered to the substrate can be eliminated, and the dimples can be easily formed.

Even when negative pressure is generated on the upstream side in the dimples, and a sealed fluid entering the sliding face evaporates, causing a deposit formation-causing substance to be precipitated and formed, the presence of the glassy carbon sheet member can prevent the deposition of precipitates on negative-pressure portions, and prevent the adhesion of deposits on a land.

According to a fifth aspect of the present invention, in the sliding component in any one of the first to third aspects, the sheet member has a sliding face provided with spiral grooves.

According to this aspect, positive pressure (dynamic pressure) can be generated at the sliding face, so that a fluid film between the sliding faces can be increased to improve lubrication performance.

The spiral grooves can be provided previously with a mold or by blanking when the sheet member is produced. Thus, the need to form the spiral grooves after the sheet member is adhered to the substrate can be eliminated, and the spiral grooves can be easily formed.

Even when negative pressure is generated on the upstream side in the spiral grooves, and a sealed fluid entering the sliding face evaporates, causing a deposit formation-causing substance to be precipitated and formed, the presence of the glassy carbon sheet member can prevent the deposition of precipitates on negative-pressure portions, and prevent the adhesion of deposits on a land.

According to a sixth aspect of the present invention, in the sliding component in any one of the first to third aspects, the sheet member has a sliding face provided with at least one Rayleigh step mechanism.

According to this aspect, positive pressure (dynamic pressure) can be generated at the sliding face, so that a fluid film between the sliding faces can be increased to improve lubrication performance.

The at least one Rayleigh step mechanism can be provided previously with a mold when the sheet member is produced. Thus, the need to form the at least one Rayleigh step mechanism after the sheet member is adhered to the substrate can be eliminated, and the at least one Rayleigh step mechanism can be easily formed.

Even when negative pressure is generated on the upstream side in the at least one Rayleigh step mechanism, and a deposit formation-causing substance is precipitated and formed from a sealed fluid entering the sliding face, the presence of the glassy carbon sheet member can prevent the deposition of precipitates on negative-pressure portions, and prevent the adhesion of deposits on a land.

Effect of the Invention

The present invention achieves the following outstanding effects.

(1) At least one of the stationary-side seal ring and the rotating-side seal ring includes the substrate, the adhesion layer on the sliding face side of the substrate, and the glassy carbon sheet member stuck on the substrate via the adhesion layer, so that the presence of glassy carbon on the sliding face S of the seal ring prevents concentration of a deposit formation-causing substance and formation of deposits on the sliding face S. Thus, the sliding component improved in the sealing function of the sliding face can be provided.

Glassy carbon, which is a material excellent in wear resistance, can prevent wear on the sliding face sliding in a fluid lubrication state from reaching a deep portion, improving the wear resistance and foreign matter-resistant properties of the sliding component.

Separately from the substrate of the seal ring, the sheet member of sheet-shaped glassy carbon is stuck on the sliding face side of the substrate. This configuration can facilitate the escape of gas generated from inside to prevent occurrence of cracks, compared to the case where an entire seal ring is formed of glassy carbon as in Conventional Art 2. Further, the poor thermal conductivity of glassy carbon can be covered by the material of the substrate.

Even a large seal ring that cannot be manufactured when an entire seal ring is formed of glassy carbon can be manufactured.

Even when a surface texture is formed on the sliding face, the surface texture can be formed on the sheet member, and thus is easily formed.

Separately from the substrate of the seal ring, the sheet member of sheet-shaped glassy carbon is stuck on the sliding face side of the substrate. This configuration enables provision of a glassy carbon region on the sliding face without requiring an advanced technique, compared to the case where a glassy carbon modified region is formed on a sliding face of a sliding material as in Conventional Art 3.

The material of the substrate is not limited to materials that allow formation of a glassy carbon modified region. Thus, the degree of freedom in material selection can be increased. For example, a low-cost material can be selected to reduce material cost. Alternatively, for example, a material with good thermal conductivity can be selected to provide a sliding component with high heat dispersion characteristics.

Even when a surface texture is formed on the sliding face, the surface texture can be formed on the sheet member, and thus is easily formed.

(2) The substrate is formed of carbon, SiC, or cemented carbide, so that the sliding component can be produced with a commonly used material.

(3) The adhesion layer is formed of a thermosetting resin, so that only by heating the adhesion layer, the glassy carbon sheet member can be securely integrated with the substrate.

(4) The sheet member has the sliding face provided with the dimples, so that the sealed fluid can be held and positive pressure (dynamic pressure) can be generated at the sliding face. Thus, the fluid film between the sliding faces can be increased to improve lubrication performance.

The dimples can be provided previously with a mold or by blanking when the sheet member is produced. Thus, the need to form the dimples after the sheet member is adhered to the substrate can be eliminated, and the dimples can be easily formed.

Even when negative pressure is generated on the upstream side in the dimples, and a deposit formation-causing substance is precipitated and formed from the sealed fluid entering the sliding face, the presence of the glassy carbon sheet member can prevent the deposition of precipitates on negative-pressure portions, and prevent the adhesion of deposits on the land.

(5) The sheet member has the sliding face provided with the spiral grooves, so that positive pressure (dynamic pressure) can be generated at the sliding face, and the fluid film between the sliding faces can be increased to improve lubrication performance.

The spiral grooves can be provided previously with a mold or by blanking when the sheet member is produced. Thus, the need to form the spiral grooves after the sheet member is adhered to the substrate can be eliminated, and the spiral grooves can be easily formed.

Even when negative pressure is generated on the upstream side in the spiral grooves, and the sealed fluid entering the sliding face evaporates, causing a deposit formation-causing substance to be precipitated and formed, the presence of the glassy carbon sheet member can prevent the deposition of precipitates on negative-pressure portions, and prevent the adhesion of deposits on the land.

(6) The sheet member has the sliding face provided with the at least one Rayleigh step mechanism, so that positive pressure (dynamic pressure) can be generated at the sliding face, and the fluid film between the sliding faces can be increased to improve lubrication performance.

The at least one Rayleigh step mechanism can be provided previously with a mold when the sheet member is produced. Thus, the need to form the at least one Rayleigh step mechanism after the sheet member is adhered to the substrate can be eliminated, and the at least one Rayleigh step mechanism can be easily formed.

Even when negative pressure is generated on the upstream side in the at least one Rayleigh step mechanism, and the sealed fluid entering the sliding face evaporates, causing a deposit formation-causing substance to be precipitated and formed, the presence of the glassy carbon sheet member can prevent the deposition of precipitates on negative-pressure portions, and prevent the adhesion of deposits on the land.

BRIEF DESCRIPTION OF THE DRAWINGS

FIG. 3A is an enlarged cross-sectional view showing one sliding part of a sliding component according to a second embodiment of the present invention, provided such that a sliding face is located above.

FIG. 3B is an enlarged plan view showing the sliding face in FIG. 3A.

FIG. 5A is an enlarged cross-sectional view showing one sliding part of a sliding component according to a fourth embodiment of the present invention, provided such that a sliding face is located above.

FIG. 5B is an enlarged plan view showing the sliding face in FIG. 5A.

FIGS. 6A and 6B are explanatory diagrams illustrating the function of a Rayleigh step in the present invention.

DESCRIPTION OF EMBODIMENTS

Hereinafter with reference to the drawings, a mode for carrying out this invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
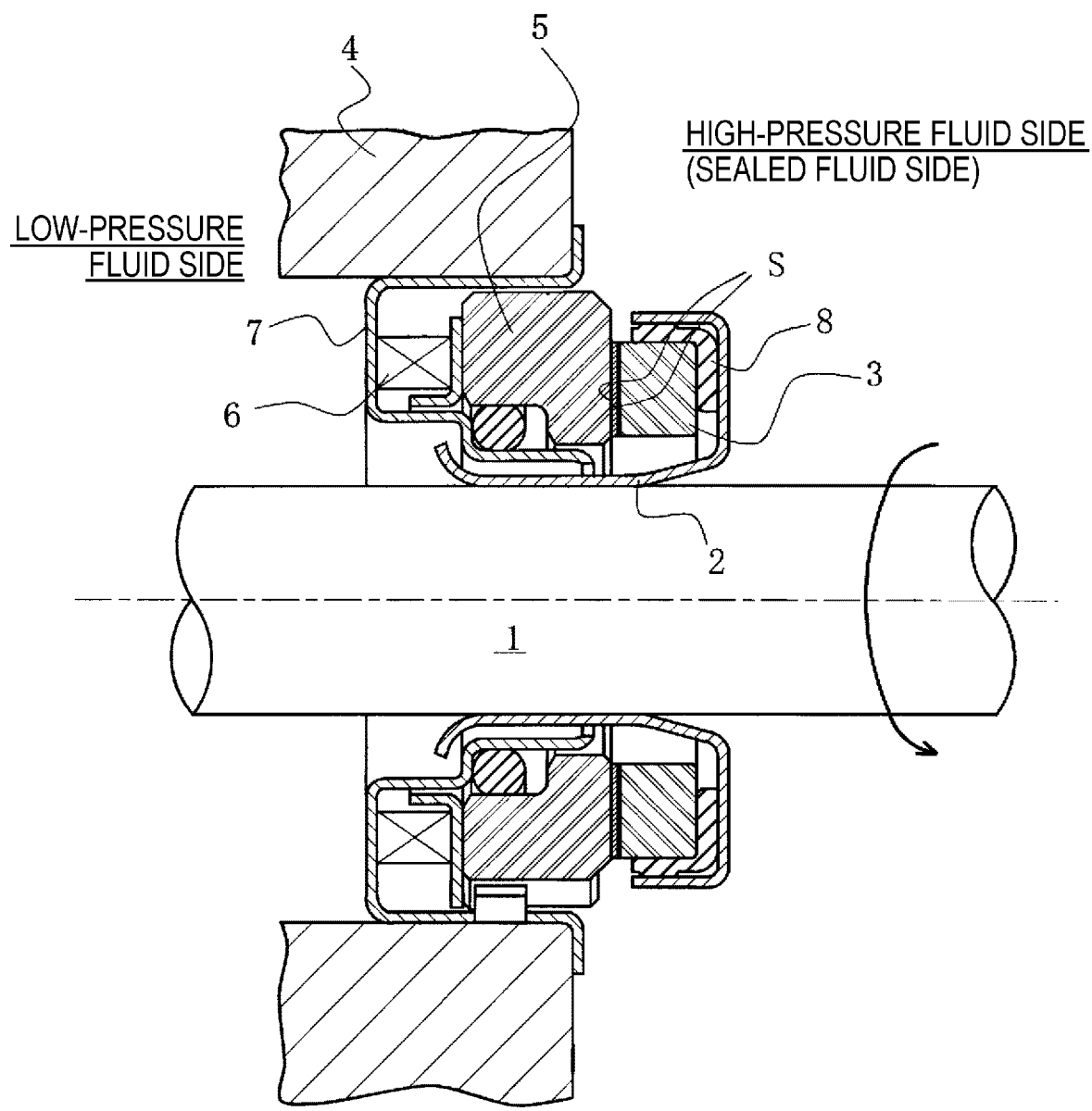
FIG. 1 is a vertical cross-sectional view showing an example of a mechanical seal according to a first embodiment of the present invention.
Figure 2B:
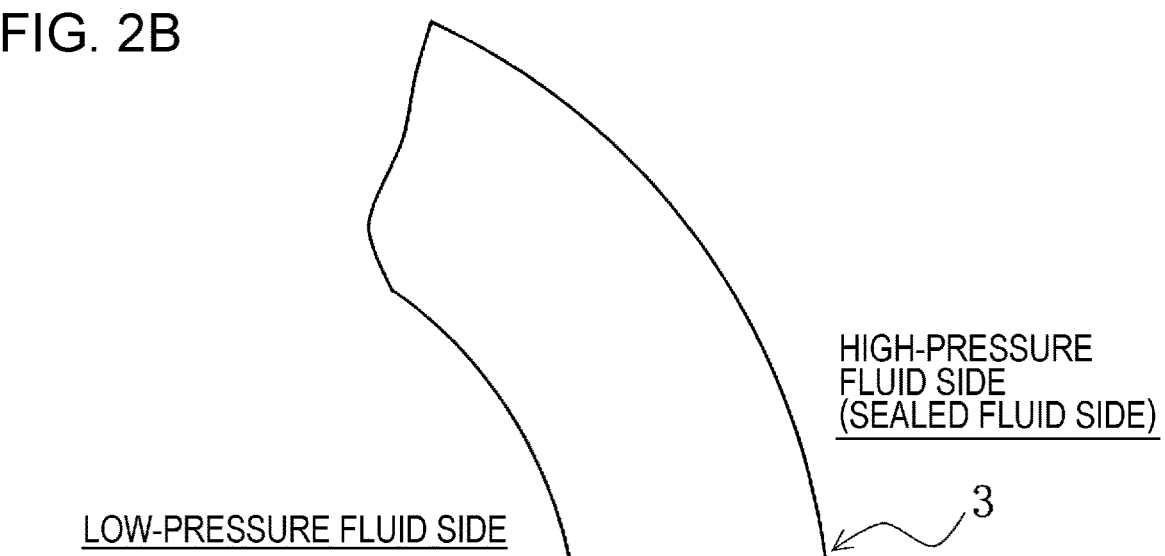
FIG. 2B is an enlarged plan view showing the sliding face in FIG. 2A.
Figure 2A:
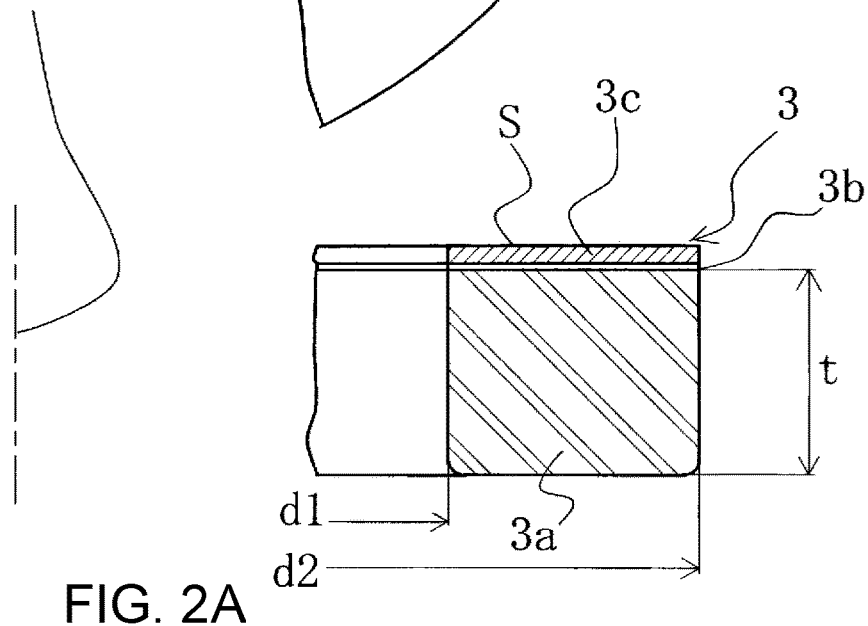
FIG. 2A is an enlarged cross-sectional view showing one sliding part of a sliding component according to the first embodiment of the present invention, provided such that a sliding face is located above.

With reference to FIG. 1 and FIGS. 2A and 2B, a sliding component according to a first embodiment of the present invention will be described.

This embodiment describes, as an example, a mechanical seal that is an example of the sliding component. The outer-peripheral side of sliding parts constituting the mechanical seal is described as the high-pressure fluid side (sealed fluid side), and the inner-peripheral side as the low-pressure fluid side (atmosphere side). The present invention is not limited to this, and is applicable to the case where the high-pressure fluid side and the low-pressure fluid side are reversed.

FIG. 1 is a vertical cross-sectional view showing an example of the mechanical seal, which is an inside mechanical seal in the form of sealing a sealed fluid on the high-pressure fluid side that tends to leak from the outer periphery toward the inner periphery of a sliding face S (In the description, when it is meaningful to refer to each sliding face of a pair of sliding faces, the sliding faces are referred to as "sliding faces S," and when only one of the sliding faces is referred to, the sliding face is referred to as a "sliding face S."). The mechanical seal is provided with an annular rotating-side seal ring 3 that is one seal ring provided via a sleeve 2 and a cup gasket 8 at a rotating shaft 1 to drive a rotating member (not shown) on the high-pressure fluid side, in a state of being integrally rotatable with the rotating shaft 1, and an annular stationary-side seal ring 5 that is the other seal ring provided at a housing 4 via a sleeve 7 in non-rotating and axially movable states. With a biasing member 6 axially biasing the stationary-side seal ring 5, the rotating-side seal ring 3 and the stationary-side seal ring 5 slide in close contact with each other at the sliding faces S mirror-finished by lapping or the like. That is, the mechanical seal prevents, at respective sliding faces S of the rotating-side seal ring 3 and the stationary-side seal ring 5, the sealed fluid from flowing out from the high-pressure fluid side (outer-peripheral side) into the low-pressure fluid side (inner-peripheral side) of the two seal rings 3 and 5.

In FIG. 1, the radial width of the sliding face S of the rotating-side seal ring 3 is set smaller than the radial width of the sliding face S of the stationary-side seal ring 5. The entire region of the sliding face S of the rotating-side seal ring 3 is brought into contact with the sliding face S of the stationary-side seal ring 5. The sliding faces of the two seal rings 3 and 5 slide relatively in a fluid lubrication state.

Note that the present invention is not limited to FIG. 1. Alternatively, the radial width of the sliding face S of the rotating-side seal ring 3 may be set larger than the radial width of the sliding face S of the stationary-side seal ring 5.

As shown in FIG. 1 and FIG. 2A, at least one seal ring of the rotating-side seal ring 3 and the stationary-side seal ring 5, in this example, the rotating-side seal ring 3 includes a substrate 3a, an adhesion layer 3b on the sliding face side of the substrate 3a, and a glassy carbon sheet member 3c stuck on the substrate 3a via the adhesion layer 3b. This point will be described in detail later.

The other seal ring, in this example, the stationary-side seal ring 5 is formed of a substrate in one body.

Note that the present invention is not limited to FIG. and FIGS. 2A and 2B. Alternatively, a stationary-side seal ring may include an adhesion layer on the sliding face side of a substrate, and a glassy carbon sheet member stuck on the substrate via the adhesion layer, and a rotating-side seal ring may be formed of a substrate in one body.

The sealed fluid is a fluid such as antifreeze to which a rust inhibitor is added.

The material of the substrates of the rotating-side seal ring 3 and the stationary-side seal ring 5 is typically selected from silicon carbide (SiC) excellent in wear resistance, carbon and cemented carbide excellent in self-lubricity, and the like. For example, both may be silicon carbide, or a combination of the rotating-side seal ring 3 being silicon carbide and the stationary-side seal ring 5 being carbon is possible.

As a sliding material of mechanical seals or the like, silicon carbide, in particular, is known to be a suitable material with good heat dispersion characteristics and excellent wear resistance. However, as described above, there is a problem that because of the properties of a rust-inhibiting component contained in antifreeze, a deposit formation-causing substance concentrated and formed accumulates on a sliding face, causing the sliding face to lose smoothness, and thus leading to leakage.

Thus, the present invention is characterized in that at least one seal ring of the rotating-side seal ring 3 and the stationary-side seal ring 5 includes a substrate, an adhesion layer on the sliding face side of the substrate, and a glassy carbon sheet member stuck on the substrate via the adhesion layer.

Glassy carbon is a material made by carbonizing a thermosetting resin, not glass, and is characterized by not passing gas, passing electricity, being acid resistant, being wear resistant, and so on.

In a typical method of manufacturing glassy carbon, a thermosetting resin such as a phenol resin, a polyimide resin, an epoxy resin, or a furan resin is molded by injection molding, compression molding, or the like, and the resin molding is fired and carbonized in an inert gas atmosphere at one thousand some hundreds degrees Celsius. Firing causes elements other than carbon in the resin molding, that is, hydrogen, nitrogen, oxygen, and the like to chemically combine with carbon around them, forming cracked gas such as carbon dioxide, methane, ethane, and the like, and being released. Finally, only a carbon mesh skeleton is left, constituting glassy carbon.

Glassy carbon also includes composite glassy carbon made by mixing a filler, a filling material, with a thermosetting resin, and firing the mixture. The composite glassy carbon can be further enhanced in properties such as lubricity by mixing a micro-sized or nano-sized filler.

As shown in FIG. 2A under magnification, the rotating-side seal ring 3 includes the substrate 3a, the adhesion layer 3b on the sliding face side of the substrate 3a, and the glassy carbon sheet member 3c stuck on the substrate 3a via the adhesion layer 3b.

The glassy carbon sheet member 3c is formed separately by working one made as a glassy carbon sheet member into the same shape as the planar shape of the sliding face side of the substrate 3a. The thickness of the glassy carbon sheet member 3c in the present invention is about 100 times larger than the thickness of the diamond-like carbon film that is about 1 μm in Conventional Art 1. Thus, the glassy carbon sheet member 3c is characterized by being resistant to peeling compared to the coating of the diamond-like carbon film.

The adhesion layer 3b is made of a thermosetting resin, and is applied to the entire surface of the glassy carbon sheet member 3c.

The substrate 3a is made of silicon carbide (SiC) or carbon, and is worked to a predetermined inner diameter d1, outer diameter d2, and thickness t.

In the manufacturing of the rotating-side seal ring 3, first, the adhesion layer 3b made of a thermosetting resin is applied to the sliding face side of the substrate 3a worked into a predetermined shape, and the glassy carbon sheet member 3c is attached to the top of the adhesion layer 3b, so that the glassy carbon sheet member 3c is stuck on the substrate 3a via the adhesion layer 3b. Next, the adhesion layer 3b made of the thermosetting resin is heated to be cured. The curing of the thermosetting resin adhesion layer 3b causes the glassy carbon sheet member 3c to be stuck on the sliding face side of the substrate 3a and integrated with the substrate 3a.

In the curing of the adhesion layer 3b made of the thermosetting resin, the adhesion layer 3b is heated to about 300° C. to thermally cure the thermosetting resin. Depending on the type of the substrate 3a, the adhesion layer 3b may be heated until the thermosetting resin is carbonized as needed.

The sliding component in the first embodiment described above achieves the following outstanding effects.

(1) The presence of glassy carbon on the sliding face S of a seal ring prevents concentration of a deposit formation-causing substance and formation of deposits on the sliding face S. Thus, the sliding component improved in the sealing function of the sliding face S can be provided.

Glassy carbon, which is a material excellent in wear resistance, can prevent wear on the sliding face sliding in a fluid lubrication state from reaching a deep portion, improving the wear resistance and foreign matter-resistant properties of the sliding component.

Note that the foreign matter includes foreign matter from outside and deposits.

(2) Separately from the substrate 3a of the seal ring, the sheet member 3c of sheet-shaped glassy carbon is stuck on the side of the sliding face S of the substrate 3a. This configuration can facilitate the escape of gas generated from inside to prevent occurrence of cracks, compared to the case where an entire seal ring is made of glassy carbon as in Conventional Art 2. Further, the poor thermal conductivity of glassy carbon can be covered by the material of the substrate 3a.

Even a large seal ring that cannot be manufactured when an entire seal ring is made of glassy carbon can be manufactured.

Even when a surface texture is formed on the sliding face S, the surface texture can be formed on the sheet member 3c, and thus is easily formed.

(3) Separately from the substrate 3a of the seal ring, the sheet member 3c of sheet-shaped glassy carbon is stuck on the side of the sliding face S of the substrate 3a. This configuration enables provision of a glassy carbon region on the sliding face S without requiring an advanced technique, compared to the case where a glassy carbon modified region is formed on a sliding face of a sliding material as in Conventional Art 3.

The material of the substrate 3a is not limited to materials that allow formation of a glassy carbon modified region. Thus, the degree of freedom in material selection can be increased. For example, a low-cost material can be selected to reduce material cost. Alternatively, for example, a material with good thermal conductivity can be selected to provide a sliding component with high heat dispersion characteristics.

Even when a surface texture is formed on the sliding face S, the surface texture can be formed on the sheet member 3c, and thus is easily formed.

Second Embodiment

With reference to FIGS. 3A and 3B, a sliding component according to a second embodiment of the present invention will be described.

The sliding component according to the second embodiment is different from that of the first embodiment in that a surface texture is provided on a sliding face, but in the other basic configuration, is identical to that of the first embodiment, and will not be redundantly described.

In FIGS. 3A and 3B, a rotating-side seal ring 3 includes a substrate 3a, an adhesion layer 3b on the sliding face side of the substrate 3a, and a glassy carbon sheet member 3c stuck on the substrate 3a via the adhesion layer 3b. A sliding face S of the sheet member 3c is provided with dimples 10.

In FIG. 3A, the dimples 10 are provided through the sheet member 3c, but are not limited to this. The dimples 10 may be provided to a depth shallower than the thickness of the sheet member 3c, for example.

In FIG. 3B, a plurality of circular dimples 10 is arranged circumferentially, independently of each other, and is separated from the high-pressure fluid side and the low-pressure fluid side by a land R (which means a portion on which no grooves such as dimples are formed).

The shape of the dimples 10 may alternatively be oval, elliptic, or rectangular instead of being circular. The diameter and depth of the dimples 10 are determined in design depending on the specifications of the sliding component, that is, the diameter of the sliding face, sliding speed, the viscosity of a sealed fluid, and others. For example, the diameter of the dimples 10 is properly in a range of 50 μm to 200 μm, and the depth in a range of 0.1 μm to 100 μm. The radial arrangement of the dimples 10 is not limited to two rows, and may be three or more rows. The circumferential pitch of the dimples 10 is determined in design as appropriate.

The plurality of dimples 10 formed on the sliding face holds a sealed fluid entering as a hydrodynamic lubricating liquid film between the sliding face and the opposing sliding face. The individual dimples 10 can each be considered to constitute a Rayleigh step.

Specifically, in FIG. 3B, a Rayleigh step is formed at a downstream surface 10a of each dimple 10 formed on the sliding face of the rotating-side seal ring 3. The downstream surface 10a is orthogonal to the rotational direction of the opposing sliding face shown by an arrow. The sliding face S of the stationary-side seal ring is flattened. When the sliding face opposite to the sliding face of the rotating-side seal ring 3 relatively rotates in the arrow direction, fluid interposed between the sliding faces S tends to follow and move in the moving directions of the sliding faces S due to its viscosity. Thus, there is negative pressure on the upstream side in the dimples 10, and at the same time, positive pressure (dynamic pressure) is generated at the Rayleigh steps 10a.

The function of the Rayleigh steps will be described in detail below.

Positive pressure generation mechanisms formed of the dimples 10 hold the sealed fluid, and generate positive pressure (dynamic pressure), thereby increasing a fluid film between the sliding faces S, and improving lubrication performance.

The sliding component in the second embodiment described above achieves the following outstanding effects in addition to the effects of the first embodiment.

(1) The dimples 10 can be provided previously with a mold when the sheet member 3c is produced. Thus, the need to form the dimples 10 after the sheet member 3c is adhered to the substrate 3a can be eliminated, and the dimples 10 can be easily formed.

(2) Even when the produced sheet member 3c is worked on to form the dimples 10 previously before being stuck on the substrate 3a, the sheet shape allows the dimples 10 to be formed by blanking. Thus the dimples 10 can be relatively easily formed.

(3) Even when negative pressure is generated on the upstream side in the dimples 10, and the sealed fluid entering the sliding face S evaporates, causing a deposit formation-causing substance to be precipitated and formed, the presence of the glassy carbon sheet member 3c can prevent the deposition of precipitates on negative-pressure portions, and prevent the adhesion of deposits on the land R.

Third Embodiment

Figures 4A, 4B:
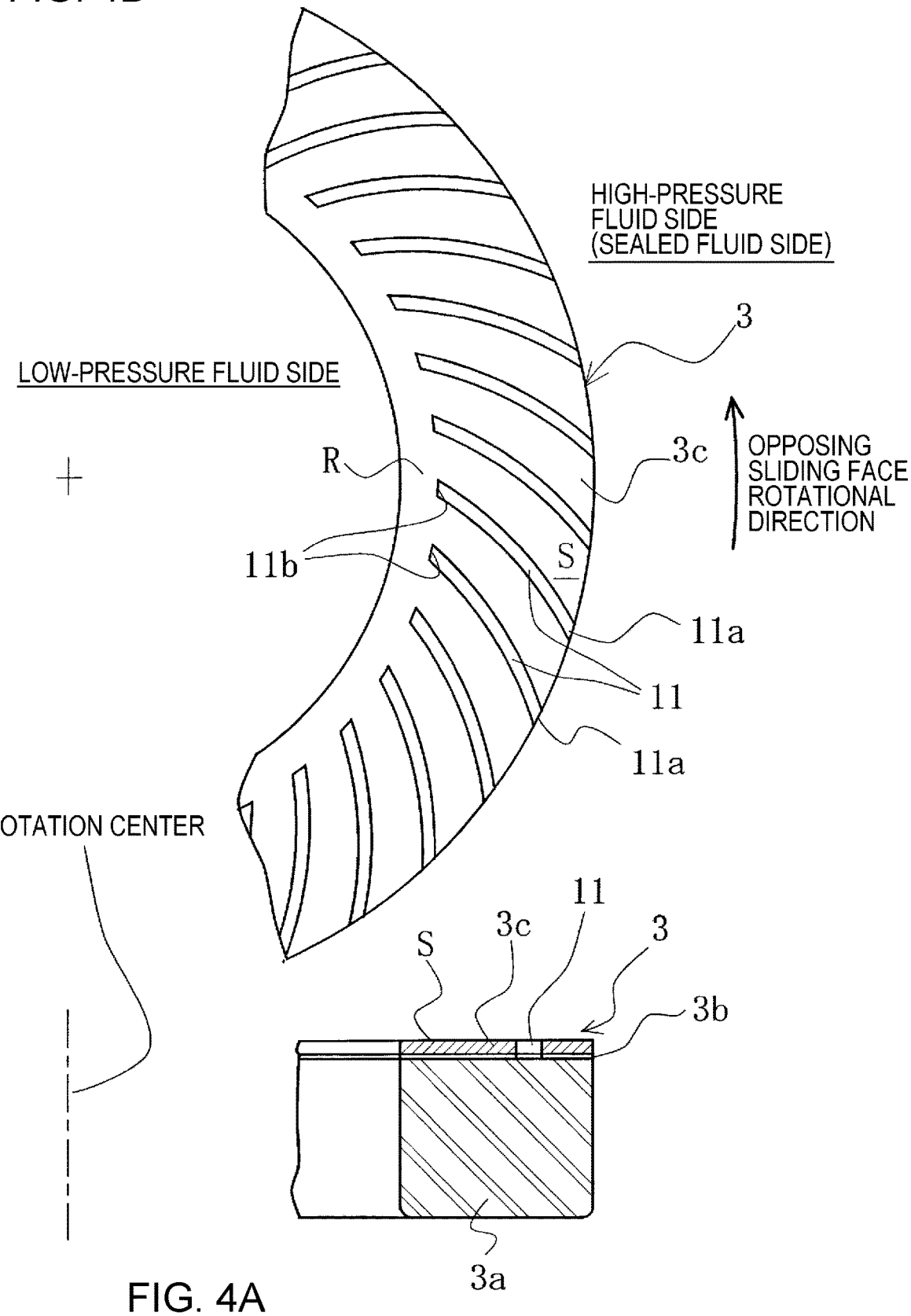
FIG. 4A is an enlarged cross-sectional view showing one sliding part of a sliding component according to a third embodiment of the present invention, provided such that a sliding face is located above.
FIG. 4B is an enlarged plan view showing the sliding face in FIG. 4A.

With reference to FIGS. 4A and 4B, a sliding component according to a third embodiment of the present invention will be described.

The sliding component according to the third embodiment is different from that of the first embodiment in that a surface texture is provided on a sliding face, but in the other basic configuration, is identical to that of the first embodiment, and will not be redundantly described.

In FIGS. 4A and 4B, a rotating-side seal ring 3 includes a substrate 3a, an adhesion layer 3b on the sliding face side of the substrate 3a, and a glassy carbon sheet member 3c stuck on the substrate 3a via the adhesion layer 3b. A sliding face S of the sheet member 3c is provided with spiral grooves 11.

As shown in FIG. 4B, the sliding face S of the sheet member 3c is provided with a plurality of circumferentially spaced spiral grooves 11. The spiral grooves 11 are inclined from the outer-peripheral side toward the inner-peripheral side of the sliding face S in the rotational direction of the opposing sliding face, and communicate with the high-pressure fluid side at proximal ends 11a on the outer-peripheral side, and are separated from the low-pressure fluid side at distal ends 11b on the inner-peripheral side by a land R of the sliding face S, and blocked at groove outlets. Thus, each distal end 11b on the inner-peripheral side can be considered to constitute a Rayleigh step.

Note that the shape of the spiral grooves 11 is not limited to the shape shown in FIG. 4B, and may be, for example, a rectangular groove provided at an angle from the outer-peripheral side toward the inner-peripheral side of the sliding face S in the rotational direction of the opposing sliding face. The proximal ends 11a on the outer-peripheral side may alternatively be separated from the high-pressure fluid side by the land R without communicating with the high-pressure fluid side.

The width and depth of the spiral grooves 11 are determined in design depending on the specifications of the sliding component, that is, the diameter of the sliding face, sliding speed, the viscosity of a sealed fluid, and others.

When the rotating-side seal ring 3 rotates, the sealed fluid is taken into the spiral grooves 11 in minute quantities from the proximal ends 11a on the outer-peripheral side of the sliding face S, and fluid interposed between the sliding faces S tends to follow and move in the moving directions of the sliding faces S due to its viscosity. Consequently, there is negative pressure on the upstream side in the spiral grooves 11, and at the same time, positive pressure (dynamic pressure) is generated at the distal ends 11b (Rayleigh steps).

The function of the Rayleigh steps will be described in detail below.

Positive pressure generation mechanisms formed of the spiral grooves 11 introduce the sealed fluid into the spiral grooves 11 and generate positive pressure (dynamic pressure), thereby increasing a fluid film between the sliding faces S and thus improving lubrication performance.

The sliding component in the third embodiment described above achieves the following outstanding effects in addition to the effects of the first embodiment.

(1) The spiral grooves 11 can be provided previously with a mold when the sheet member 3c is produced. Thus, the need to form the spiral grooves 11 after the sheet member 3c is adhered to the substrate 3a can be eliminated, and the spiral grooves 11 can be easily formed.

(2) Even when the produced sheet member 3c is worked on to form the spiral grooves 11 previously before being stuck on the substrate 3a, the sheet shape allows the spiral grooves 11 to be formed by blanking. Thus the spiral grooves 11 can be relatively easily formed.

(3) Even when negative pressure is generated on the upstream side in the spiral grooves 11, and the sealed fluid entering the sliding face S evaporates, causing a deposit formation-causing substance to be precipitated and formed, the presence of the glassy carbon sheet member 3c can prevent the deposition of precipitates on negative-pressure portions, and prevent the adhesion of deposits on the land R.

Fourth Embodiment

With reference to FIGS. 5A and 5B, a sliding component according to a fourth embodiment of the present invention will be described.

The sliding component according to the fourth embodiment is different from that of the first embodiment in that a surface texture is provided on a sliding face, but in the other basic configuration, is identical to that of the first embodiment, and will not be redundantly described.

In FIGS. 5A and 5B, a rotating-side seal ring 3 includes a substrate 3a, an adhesion layer 3b on the sliding face side of the substrate 3a, and a glassy carbon sheet member 3c stuck on the substrate 3a via the adhesion layer 3b. A sliding face S of the sheet member 3c is provided with a plurality of Rayleigh step mechanisms 12.

As shown in FIGS. 5A and 5B, the sliding face S of the sheet member 3c is provided with the Rayleigh step mechanisms 12 each including a positive pressure generation groove 12a. Each positive pressure generation groove 12a communicates with a radial groove 13 deeper than the positive pressure generation groove 12a at an upstream inlet 12b, and is separated at portions other than the inlet 12b by a land R.

For example, when the diameter of the sliding face S is about 20 mm, and the sliding face width is about 2 mm, the width of each positive pressure generation groove 12a is 0.4 mm to 0.6 mm and the depth is some micrometers, and the width of each radial groove 13 (circumferential angle) is about 6° and the depth is some tens of micrometers.

In FIG. 5B, the plurality of Rayleigh step mechanisms is provided in a circumferential direction of the sliding face S, which is not limiting. It is only necessary that at least one Rayleigh step mechanism 12 be provided.

When the rotating-side seal ring 3 rotates, a sealed fluid enters the positive pressure generation grooves 12a through the radial grooves 13, and fluid interposed between the sliding faces S tends to follow and move in the moving directions of the sliding faces S due to its viscosity. Consequently, there is negative pressure on the upstream side in the positive pressure generation grooves 12a, and at the same time, positive pressure (dynamic pressure) is generated at Rayleigh steps 12c at downstream ends.

The function of the Rayleigh steps will be described in detail below.

The Rayleigh step mechanisms 12 generate positive pressure (dynamic pressure), thereby increasing a fluid film between the sliding faces S and improving lubrication performance.

The sliding component in the fourth embodiment described above achieves the following outstanding effects in addition to the effects of the first embodiment.

(1) The Rayleigh step mechanisms 12 and the radial grooves 13 can be provided previously with a mold when the sheet member 3c is produced. Thus, the need to form the Rayleigh step mechanisms 12 and the radial grooves 13 after the sheet member 3c is adhered to the substrate 3a can be eliminated, and the Rayleigh step mechanisms 12 and the radial grooves 13 can be easily formed.

(2) Even when the produced sheet member 3c is worked on to form the Rayleigh step mechanisms 12 and the radial grooves 13 previously before being stuck on the substrate 3a, the sheet shape allows the radial grooves 13 to be formed by blanking, for example. Thus the radial grooves 13 can be relatively easily formed.

(3) Even when negative pressure is generated on the upstream side in the Rayleigh step mechanisms 12, and the sealed fluid entering the sliding face S evaporates, causing a deposit formation-causing substance to be precipitated and formed, the presence of the glassy carbon sheet member 3c can prevent the deposition of precipitates on negative-pressure portions, and prevent the adhesion of deposits on the land R.

Next, with reference to FIGS. 6A and 6B, the function of the Rayleigh steps in the present invention is described.

In FIG. 6A, when the rotating-side seal ring 3 rotationally moves in a direction shown by an arrow relative to the stationary-side seal ring 5, with a surface texture formed of the dimples 10, the spiral grooves 11, the Rayleigh step mechanisms 12, or the like provided on the sliding face S of the rotating-side seal ring 3, there is a narrowed gap (step) 14 on the downstream side of the surface texture. The opposing sliding face of the stationary-side seal ring 5 is flat.

When the rotating-side seal ring 3 relatively moves in the direction shown by the arrow, fluid interposed between the sliding faces of the rotating-side seal ring 3 and the stationary-side seal ring 5 tends to follow and move in the moving direction of the rotating-side seal ring 3 due to its viscosity. Consequently, at that time, dynamic pressure (positive pressure) as shown by broken lines is generated by the presence of the narrowed gap (step) 14.

In FIG. 6B, when the rotating-side seal ring 3 rotationally moves in a direction shown by an arrow relative to the stationary-side seal ring 5, with a surface texture formed of the dimples 10, the spiral grooves 11, the Rayleigh step mechanisms 12, or the like provided on the sliding face S of the rotating-side seal ring 3, there is a widened gap (step) 15 on the upstream side of the surface texture. The opposing sliding face of the stationary-side seal ring 5 is flat.

When the rotating-side seal ring 3 relatively moves in the direction shown by the arrow, fluid interposed between the sliding faces of the rotating-side seal ring 3 and the stationary-side seal ring 5 tends to follow and move in the moving direction of the rotating-side seal ring 3 due to its viscosity. Consequently, at that time, dynamic pressure (negative pressure) as shown by broken lines is generated by the presence of the widened gap (step) 15.

Thus, negative pressure is generated on the upstream side of the surface texture formed of the dimples 10, the spiral grooves 11, the Rayleigh step mechanisms 12, or the like, and positive pressure is generated on the downstream side.

Although the embodiments of the present invention have been described above with reference to the drawings, a specific configuration thereof is not limited to these embodiments. Any changes and additions made without departing from the scope of the present invention are included in the present invention.

For example, the above embodiments have described the sliding component with an example where, of a pair of rotating and stationary seal rings in a mechanical seal device, the rotating seal ring includes a substrate, an adhesion layer on the sliding face side of the substrate, and a glassy carbon sheet member stuck on the substrate via the adhesion layer. The present invention is not limited to this. Alternatively, the stationary seal ring may include a substrate, an adhesion layer on the sliding face side of the substrate, and a glassy carbon sheet member stuck on the substrate via the adhesion layer.

Further, for example, the above embodiments have described the case where a high-pressure sealed fluid is present on the outer-peripheral side of a rotating seal ring and a stationary seal ring. The present invention is also applicable to the case where a high-pressure fluid is on the inner-peripheral side.

Further, for example, the above embodiments have described the thickness of the glassy carbon sheet member 3c as being about 100 times larger than the thickness of the diamond-like carbon film that is about 1 μm. This only shows a general indicator. The thickness of the glassy carbon sheet member 3c is determined in design, depending on the specifications of the sliding component such as the outer diameter, the inner diameter, and sliding speed.

The invention claimed is:

1. A sliding component comprising:
an annular stationary-side seal ring fixed to a stationary side; and
an annular rotating-side seal ring rotating with a rotating shaft, the stationary-side and the rotating-side seal rings having sliding faces in a radial direction perpendicular to the rotating shaft, the sliding faces being relatively rotated, thereby sealing a high-pressure fluid present on one radial side of the sliding faces relatively rotationally sliding, wherein
at least one of the stationary-side and the rotating-side seal ring comprises a substrate, an adhesion layer on a sliding face side of the substrate, and a glassy carbon sheet member stuck on the substrate via the adhesion layer,
wherein the substrate is made of one of carbon, SiC, or cemented carbide,
the adhesion layer is made of a thermosetting resin,
the glassy carbon sheet member includes composite glassy carbon constituted by a fired mixture of a filler and a thermosetting resin, and has the sliding face provided with surface textures passing entirely through the glassy carbon sheet member, and
wherein the surface textures are Rayleigh step mechanisms having a radial groove and a positive pressure generating groove communicating with the radial groove, the radial groove is a deeper groove than the positive pressure generating groove and penetrates entirely through the glassy carbon sheet member in a direction along the rotating shaft, and the positive pressure generating groove is a shallower groove than the radial groove and does not penetrate entirely through the glassy carbon sheet member.

* * * * *